(12) United States Patent
Nair et al.

(10) Patent No.: US 9,029,431 B2
(45) Date of Patent: May 12, 2015

(54) POROUS PARTICLES AND METHODS OF MAKING THEM

(71) Applicants: Mridula Nair, Penfield, NY (US);
Tamara K. Jones, Rochester, NY (US);
Mark R. Mis, Hornell, NY (US)

(72) Inventors: Mridula Nair, Penfield, NY (US);
Tamara K. Jones, Rochester, NY (US);
Mark R. Mis, Hornell, NY (US)

(73) Assignee: Eastman Kodak Company, Rochester, NY (US)

( * ) Notice: Subject to any disclaimer, the term of this patent is extended or adjusted under 35 U.S.C. 154(b) by 292 days.

(21) Appl. No.: 13/686,943

(22) Filed: Nov. 28, 2012

(65) Prior Publication Data

US 2014/0148523 A1 May 29, 2014

(51) Int. Cl.
*C08J 9/00* (2006.01)
*C08J 9/28* (2006.01)

(52) U.S. Cl.
CPC .............. *C08J 9/283* (2013.01); *C08J 2201/05* (2013.01)

(58) Field of Classification Search
USPC ........................... 521/134; 430/108.1, 137.14
See application file for complete search history.

(56) References Cited

U.S. PATENT DOCUMENTS

| | | | |
|---|---|---|---|
| 2,932,629 | A | 4/1960 | Wiley et al. |
| 2,934,530 | A | 4/1960 | Ballast et al. |
| 3,615,972 | A | 10/1971 | Morehouse, Jr. et al. |
| 4,314,932 | A | 2/1982 | Wakimoto et al. |
| 4,833,060 | A | 5/1989 | Nair et al. |
| 4,965,131 | A | 10/1990 | Nair et al. |
| 7,754,409 | B2 | 7/2010 | Nair et al. |
| 7,887,984 | B2 | 2/2011 | Nair et al. |
| 8,110,628 | B1 | 2/2012 | Nair et al. |
| 8,252,414 | B2 | 8/2012 | Putnam et al. |
| 2008/0176157 | A1* | 7/2008 | Nair et al. ................ 430/108.21 |
| 2008/0176164 | A1* | 7/2008 | Nair et al. ................ 430/137.14 |
| 2010/0021838 | A1* | 1/2010 | Putnam et al. ............ 430/107.1 |
| 2012/0121813 | A1 | 5/2012 | Wang |
| 2012/0167666 | A1 | 7/2012 | Nair et al. |
| 2012/0171605 | A1 | 7/2012 | Nair et al. |

FOREIGN PATENT DOCUMENTS

| | | |
|---|---|---|
| WO | 2010/101240 A1 | 9/2010 |
| WO | 2013/016044 A1 | 1/2013 |
| WO | 2013/016080 A2 | 1/2013 |

OTHER PUBLICATIONS

M. Kanouni, et al., "Preparation of a stable double emulsion (W1/O/W2): role of the interfacial films on the stability of the system", Adv. Colloid Interface Sci., Dec. 2002.
B. Xu, et al., "Influence of experimental parameters and the copolymer structure on the size control of nanospheres in double emulsion method", J. Polym Res (2011) pp. 131-137.
R. Hayward, et al., "Dewetting Instability during the Formation of Polymersomes from Block-Copolymer-Stabilized Double Emulsions", Langmuir, (2006) vol. 22, No. 10, pp. 4457-4461.
T. N. Blanton, et al., "Antibacterial and Antifungal Protection for Toner Image", U.S. Appl. No. 13/235,789, filed Sep. 19, 2011.
D. R. Robello, "Semi-Permeable Particles Having Metallic Catalysts and Uses", U.S. Appl. No. 13/686,941, filed Nov. 28, 2012.
M. Nair, et al., "Porous Organic Polymeric Films and Preparation", U.S. Appl. No. 13/686,942, filed Nov. 28, 2012.
M. Mis, et al., "Particles Containing Organic Catalytic Materials and Uses", U.S. Appl. No. 13/686,946, filed Nov. 28, 2012.

* cited by examiner

*Primary Examiner* — Kara Boyle
(74) *Attorney, Agent, or Firm* — J. Lanny Tucker

(57) ABSTRACT

Porous particles can be prepared using an evaporative limited coalescence process in which one or more discrete cavities are stabilized within the continuous polymeric solid phase of the porous particles. The one or more discrete cavities have inner walls and are dispersed within the continuous polymeric solid phase. The porous particles further comprise a cavity stabilizing hydrocolloid on the inner walls of the one or more discrete cavities, and an amphiphilic (low HLB) block copolymer that is disposed at the interface of the discrete cavities and the continuous polymeric solid phase.

23 Claims, No Drawings

POROUS PARTICLES AND METHODS OF MAKING THEM

COPENDING APPLICATIONS

Reference is made to copending and commonly assigned U.S. Ser. No. 13/686,941 (filed on Nov. 28, 2012 by Robello, Nair, Mis, and Dirmyer and entitled SEMI-PERMEABLE PARTICLES HAVING METALLIC CATALYSTS AND USES) published as U.S. 2014/0148330.

Reference is made to copending and commonly assigned U.S. Ser. No. 13/686,946 (filed on Nov. 28, 2012 by Mis, Nair, and Robello and entitled PARTICLES CONTAINING ORGANIC CATALYTIC MATERIALS AND USES) published as U.S. 2014/0147885.

Reference is made to commonly assigned U.S. Ser. No. 13/686,942 (filed on Nov. 28, 2012 by Nair and Jones and entitled POROUS ORGANIC POLYMERIC FILMS AND PREPARATION) now issued as U.S. Pat. No. 8,916,240.

FIELD OF THE INVENTION

This invention relates to the use of stable water-in-oil emulsions containing cavity stabilizing hydrocolloids and low HLB block copolymers in a method to prepare porous particles comprising discrete cavities in a continuous polymeric solid phase.

BACKGROUND OF THE INVENTION

Porous polymeric particles have been prepared and used for many different purposes. For example, porous particles have been described for use in chromatographic columns, ion exchange and adsorption resins, drug delivery devices, cosmetic formulations, papers, and paints. The methods for generating pores in polymeric particles are well known in the field of polymer science. However, each particular porous particle often requires unique methods for their manufacture. Some methods of manufacture produce large particles without any control of the pore size while other manufacturing methods control the pore size without controlling the overall particle size.

Marker material can be included in porous particles so that the particles can be detected for a specific purpose. For example, U.S. Patent Applications 2008/0176157 (Nair et al.) and U.S. Pat. No. 8,252,414 (Putnam et al.) and U.S. Pat. No. 7,754,409 (Nair et al.) describe porous particles and a method for their manufacture, which porous particles are designed to be toner particles for use in electrophotography. Such porous particles typically contain a colorant and can be prepared using a multiple emulsion process in combination with a suspension process (such as "evaporative limited coalescence", ELC) in a reproducible manner and with a narrow particle size distribution.

U.S. Pat. No. 7,887,984 (Nair et al.) describes the use of various hydrocolloids in making porous particles. Porous particles used for these and other purposes are described also in U.S. Pat. No. 8,110,628 (Nair et al.) and U.S. Patent Applications 2012/0167666 (Nair et al.) and 2012/0171605 (Nair et al.). Such porous particles can contain multiple markers in their pores and are prepared from water-in-oil emulsions comprising pore stabilizing hydrocolloids (such as carboxymethyl cellulose), which are then combined with an external water phase to form water-in-oil-in-water emulsions. Pores containing the various markers are provided after removing the various solvents.

U.S. Pat. No. 8,110,628 (Nair et al.) describes porous particles that can be prepared using multiple water-in-oil emulsions containing desired markers and pore stabilizing hydrocolloids to prevent coalescence of the pore forming water-in-oil droplets.

While such pore stabilizing hydrocolloids can be used to provide porous particles from water-in-oil emulsions, the conditions in these emulsions must be ideal, meaning that the oil phase viscosity and elasticity must be optimal, the polymers incorporated into the oil phase must have hydrophilic groups such as carboxylic acid groups to reduce the interfacial tension between the oil phase and the water phase, and pigments that are desirably present in the oil phase or water phase provide additional interface stabilization.

If these conditions do not exist in the water-in-oil emulsions, there is less certainty that desired porous particles can be prepared. The water-oil interface is not always satisfactorily stabilized so that the formation of one or more types of pores optionally with different markers or incorporated chemicals is not predictable. Small molecule emulsifiers (surfactants) have been used to stabilize water-in-oil emulsions but such emulsifiers are dynamic and tend to migrate to other interfaces unpredictably. For example, they can migrate to the external water-oil interface and interfere with the suspension ELC process used to prepare porous polymeric particles.

There is a need for better materials that can stabilize the water-in-oil emulsions in conjunction with the pore stabilizing hydrocolloids for oil phases that do not have the ideal properties to provide interface stabilization. Therefore, there is a need for a more reliable method for preparing porous particles with such oil phases where there is more predictability in the resulting materials.

SUMMARY OF THE INVENTION

The present invention provides a porous particle comprising a water-insoluble polymer that provides a continuous polymeric solid phase including an external particle surface, and one or more discrete cavities having inner walls and that are dispersed within the continuous polymeric solid phase, wherein the porous particle further comprises a cavity stabilizing hydrocolloid on the inner walls of the one or more discrete cavities, and an amphiphilic (low HLB) block copolymer that is disposed at the interface of the one or more discrete cavities and the continuous polymeric solid phase.

This invention also provides a method for preparing a porous particle, comprising:

providing: (a) a first aqueous phase comprising a cavity stabilizing hydrocolloid, and (b) an oil phase comprising a polymer or polymer precursor, an amphiphilic (low HLB) block copolymer, and optionally an organic solvent, dispersing the first aqueous phase in the oil phase to form a water-in-oil emulsion, dispersing the water-in-oil emulsion in a second aqueous phase containing a surface stabilizing material to form a water-in-oil-in-water emulsion containing droplets of the water-in-oil emulsion, removing the organic solvent of the oil phase from the water-in-oil-in-water emulsion, or polymerizing the polymer precursor if present, to form a solidified precursor porous particle comprising a water-insoluble polymer that provides a continuous polymeric solid phase including an external particle surface, and one or more discrete cavities having inner walls and that are dispersed within the continuous polymeric solid phase, wherein the solidified precursor porous particle further comprises the cavity stabilizing hydrocolloid on the inner walls of the one or more discrete cavities, and the amphiphilic (low HLB) block copolymer that is disposed at the interface of the one or more discrete cavities and the continuous polymeric solid phase, and isolating the solidified precursor porous particle to provide a porous particle.

The present invention provides a number of advantages over small molecules and random copolymer emulsifiers. Porous particles with one or more discrete cavities can be prepared using a water-in-oil-in-water system in a manner that can accommodate a broad spectrum of polymer precursors (ethylenically unsaturated polymerizable monomers) and polymer materials. The structure of the amphiphilic block copolymers having a hydrophilic block (segment) and an oleophilic block (segment) while being similar to that of classical small molecules and random copolymer emulsifiers, the properties of each block (segment) are enhanced. The hydrophilic block is more polar than that of a classical surfactant and the oleophilic block is much more hydrophobic. As a result, the use of a low HLB amphiphilic block copolymer gives added stability to the water-in-oil emulsion by staying at the interface of the first water phase and oil phase due to its amphiphilic (and segmented) nature. The low HLB value of the block copolymer and decreased mobility due to its higher molecular weight compared to small molecule classical surfactants ensures its residence at the noted interface. The cavity stabilizing hydrocolloid on the other hand, offers added stability through viscosity and osmotic pressure control of the first aqueous phase relative to the oil phase and the external water phase. A random copolymer, however, used in place of the amphiphilic block copolymer, would have a much less propensity to effectively assembly and stay at the interface of the first water and oil phases due to its random architecture.

Thus, the noted advantages are achieved by using an amphiphilic (low HLB) block copolymer that is disposed at the interface of the one or more discrete cavities and the continuous polymeric solid phase.

DETAILED DESCRIPTION OF THE INVENTION

Definitions

As used herein to define various components of the porous particles, solutions, and materials used to make them, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "porous particles" and "particles" are meant to refer to embodiments of the present invention.

In this invention, the term "cavity" is used instead of "pore" to define a void within the continuous polymeric phase of the porous particles. Multiple cavities can be interconnected to form a network of voids or they can exist in isolation from other cavities.

The porous particles can include "micro", "meso", and "macro" discrete cavities, which according to the International Union of Pure and Applied Chemistry, are the classifications recommended for discrete cavities less than 2 nm, from 2 nm to 50 nm, and greater than 50 nm, respectively. The porous particles can include closed discrete cavities of all sizes and shapes (cavities entirely within the continuous polymeric phase). While there may be open cavities on the surface of the porous particle, such open cavities are not desirable and are generally present only by accident. The size of the porous particle, the formulation, and manufacturing conditions are the primary controlling factors for discrete cavity size.

The one or more discrete cavities can have an average size of at least 200 nm and up to and including 5 µm or typically at least 500 nm and up to and including 3 µm. For spherical discrete cavities, this average size is an "average diameter". For non-spherical discrete cavities, the average size refers to the average largest dimension". The multiple discrete cavities can have the same or different average sizes. Discrete cavity size can be determined by analyzing Scanning Electron Microscopy (SEM) images of fractured porous particles using a commercial statistical analysis software package. For example, the "average" discrete cavity size can be determined by calculating the average diameter of 20 measured discrete cavities.

Uses

The porous particles of this invention can have various uses including but not limited to use in drug delivery devices, cosmetic formulations, pharmaceuticals, and as chemical or enzymatic reactors used for biological and organic syntheses or other chemical processes, fuel cells, convertors, or any other application where a catalytically active metallic material is needed for a chemical reaction.

In addition, the porous particles can be used in chromatographic columns, ion exchange and adsorption resins, paints, adhesives, and security systems for detection of counterfeits, document authentication, and labeling of consumer goods. They can also be used in paper and plastic cards, for example passports and drivers' licenses, and other identification cards. They can be incorporated into labels, fabrics, tapes, staples, foils, paperboard, and cardboard packaging, varnishes and other coating compositions.

Porous Particles

The porous particles comprise a continuous polymeric solid phase formed from one or more water-insoluble polymers or polymer precursors (both defined below) including an external particle surface and one or more discrete cavities dispersed within the continuous polymeric solid phase. The one or more discrete cavities have inner walls and one or more cavity stabilizing hydrocolloids (described below) are disposed on the inner walls of the one or more discrete cavities. In addition, the porous particles comprise one or more amphiphilic (low HLB) block copolymers (described below) that are disposed at the interface of the one or more discrete cavities and the continuous polymeric solid phase.

In most embodiments, the continuous polymeric solid phase of the porous particles has the same composition. That is, the continuous polymeric solid phase is uniform in composition including any additives that may be incorporated into the water-insoluble polymer(s) used to prepare the continuous polymeric solid phase. In addition, if mixtures of water-insoluble polymers are used in the continuous polymeric solid phase, those mixtures are dispersed uniformly throughout.

The porous particles are generally prepared, as described below, using a water-in-oil emulsion in combination with an aqueous suspension process, such as in the ELC process.

The water-insoluble polymers useful in the practice of this invention to provide the continuous polymeric solid phase can be any type of polymer or resin that is capable of being dissolved in a suitable organic solvent (described below) and is generally insoluble in water. In some embodiments, the water-insoluble polymers can be "semi-permeable", meaning that relatively large catalytically active metallic materials (nanoparticles, for example, greater than 2 nm) or catalytic enzymes are unable to penetrate the continuous polymeric solid phase that makes up the walls of the one or more discrete cavities and are therefore retained indefinitely, while smaller reactants and products can freely diffuse through the discrete cavity walls and the continuous polymeric solid phase. Further details of such semi-permeable particles are provided in copending and commonly assigned U.S. patent application Ser. No. 13/686,941 (Robello, Nair, Mis, and Dirmyer) and Ser. No. 13/686,946 (Mis, Nair, and Robello), both identified above.

Useful water-insoluble polymers include but are not limited to, those derived from vinyl(unsaturated) monomers such as styrene monomers and condensation polymers and mixtures thereof. Such polymers include but are not limited to, homopolymers and copolymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), acrylic polymers for example formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), vinyl ketone polymers (for example, polymers formed from one or more of vinyl methyl ketone, vinyl hexyl ketone, and vinyl isopropenyl ketone), and aliphatic cellulose ester polymers. Particularly useful water-insoluble polymers include polystyrenes (including homopolymers and copolymers of styrene derivatives), polyesters, styrene/alkyl acrylate copolymers, styrene/alkyl methacrylate copolymers, styrene/acrylonitrile copolymers, styrene/butadiene copolymers, styrene/maleic anhydride copolymers, polyethylene resins, and polypropylene resins. Other useful water-insoluble polymers include polyurethanes, urethane acrylic copolymers, epoxy resins, silicone resins, polyamide resins, modified rosins, paraffins, and waxes. Still other useful water-insoluble polymers are polyesters of aromatic or aliphatic dicarboxylic acids with one or more aliphatic diols, such as polyesters of isophthalic or terephthalic or fumaric acid with diols such as ethylene glycol, cyclohexane dimethanol, bisphenol adducts of ethylene or propylene oxides, and aliphatic polyesters such as polycaprolactone, polylactic acid, polyglycolic acid, and block and graft copolymers derived from them. The polyesters can be saturated or unsaturated.

Particularly useful water-insoluble polymers are selected from polyesters, styrenic polymers (such as styrene/acrylate copolymers, styrene/alkyl methacrylate copolymers), acrylic polymers, mono-olefin polymers, vinyl ester polymers, α-methylene aliphatic monocarboxylic acid ester polymers, vinyl ether polymers, vinyl ketone polymers, and aliphatic cellulose ester polymers. Particularly useful polymers include styrene-butyl acrylate copolymers, polycaprolactone, polyurethanes, and bisphenol-A polyester.

In the practice of the present invention, the oil phase can comprise one or more suitable water-insoluble polymers as described above, or the oil phase can comprise one or more ethylenically unsaturated polymerizable monomers (such as vinyl monomers or acrylic monomers) that can be polymerized at an appropriate time to form the suitable water-insoluble polymers (see method details below). Such ethylenically unsaturated polymerizable monomers can be considered "polymer precursors" since they are polymerizable to form polymers that become the continuous polymeric solid phase of the porous particles.

Ethylenically unsaturated polymerizable monomers useful in this invention include but are not limited to, monofunctional and polyfunctional monomers such as acrylates and methacrylates, vinyl monomers, for example methyl methacrylate, butyl acrylate, styrene, vinyl pyrrolidone, divinyl benzene, ethylene glycol dimethacrylate, trimethylolpropane triacrylate, hexanediol dimethacrylate, tripropylene glycol dimethacrylate, diethylene glycol dimethacrylate, pentaerythritol triacrylate, dipentaerythritol hexamethacrylate, and neopentyl glycol di(meth)acrylate, and mixtures thereof. It is within the scope of this invention to use ethylenically unsaturated polymerizable oligomers in place of or in addition to the ethylenically unsaturated polymerizable monomers described above.

One or more cavity stabilizing hydrocolloids are disposed on the inner walls within at least some of the multiple discrete cavities, and typically, these compounds are disposed within essentially all (at least 95%) of the multiple discrete cavities. Suitable cavity stabilizing hydrocolloids include but are not limited to, both naturally occurring and synthetic, water-soluble or water-swellable polymers selected from the group consisting of cellulose derivatives [such as for example, carboxymethyl cellulose (CMC) that is also referred to as sodium carboxymethyl cellulose], gelatin (for example, alkali-treated gelatin such as cattle bone or hide gelatin, or acid treated gelatin such as pigskin gelatin), gelatin derivatives (for example, acetylated gelatin and phthalated gelatin), proteins and protein derivatives, hydrophilic synthetic polymers [such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, and methacrylamide copolymers], water soluble microgels, polyelectrolytes [such as a polystyrene sulfonate, poly(2-acrylamido-2-methylpropanesulfonate), and a polyphosphate], and mixtures of any of these classes of materials.

In order to stabilize the initial first water-in-oil emulsions so that they can be held without ripening or coalescence, it is desired that the cavity stabilizing hydrocolloids in the aqueous phase have a higher osmotic pressure than that of the oil phase depending on the solubility of water in the oil. This reduces the diffusion of water into the oil phase from the aqueous phases and thus reduces the ripening caused by migration of water between the water droplets. One can achieve a higher osmotic pressure in the aqueous phase either by increasing the concentration of the cavity stabilizing hydrocolloid or by increasing the charge on the cavity stabilizing hydrocolloid (the counter-ions of the dissociated charges on the cavity stabilizing hydrocolloid increase its osmotic pressure). It can be advantageous to have weak base or weak acid moieties in the cavity stabilizing hydrocolloids that allow for their osmotic pressures to be controlled by changing the pH. Such cavity stabilizing hydrocolloids are considered "weakly dissociating hydrocolloids". For these weakly dissociating hydrocolloids, the osmotic pressure can be increased by buffering the pH to favor dissociation, or by simply adding a base (or acid) to change the pH of the aqueous phase to favor dissociation. One example of such a weakly dissociating hydrocolloid is CMC that has a pH sensitive dissociation (the carboxylate is a weak acid moiety). For CMC, the osmotic pressure can be increased by buffering the pH, for example using a pH 6-8 buffer, or by simply adding a base to raise the pH of the aqueous phase to favor dissociation. For aqueous phases containing CMC, the osmotic pressure increases rapidly as the pH is increased from 4-8.

Other synthetic polyelectrolyte hydrocolloids such as polystyrene sulfonate, poly(2-acrylamido-2-methylpropanesulfonate), and polyphosphates are also useful cavity stabilizing hydrocolloids.

Particularly useful cavity stabilizing hydrocolloids are selected from the group consisting of carboxymethyl cellulose (CMC), a gelatin, a protein or protein derivative, a hydrophilic synthetic polymer, a water-soluble microgel, a polystyrene sulfonate, poly(2-acrylamido-2-methylpropanesulfonate), a polyphosphate, and mixtures thereof.

The cavity stabilizing hydrocolloids are generally soluble in water and have no negative impact on multiple emulsification processes. The cavity stabilizing compounds can be optionally crosslinked to minimize migration of the cavity stabilizing hydrocolloid from the one or more discrete cavities.

The amount of the one or more cavity stabilizing hydrocolloids in the porous particles will depend on the amount of porosity and size of the discrete cavities desired and the molecular weight and charge of the cavity stabilizing hydrocolloid that is chosen. For example, the one or more cavity stabilizing hydrocolloids can be present in the porous particles in an amount of at least 0.5 weight % and up to and including 20 weight %, or typically at least 1 weight % and up to and including 10 weight %, based on total porous particle dry weight.

To provide additional stability of one or more discrete cavities in the porous particles during their formation, the porous particles also comprise one or more amphiphilic (low HLB) block copolymers that are disposed at the interface of the one or more discrete cavities and the continuous polymeric solid phase. The term "amphiphilic" is generally used to refer to a molecule having a polar, water-soluble group that is attached to a non-polar, water-insoluble hydrocarbon or oleophilic group. "HLB" refers to the well known term "hydrophilic-lipophilic balance" and refers to the measure of the degree to which a compound is hydrophilic or lipophilic and is determined for a given polymer or molecule using the known Griffin's mathematical method where HLB equals 20 ($M_h/M$) wherein $M_h$ equals the molecular weight of the hydrophilic block in the molecule and M equals the molecular weight of the whole block copolymer. Thus, the amphiphilic block copolymers useful in the present invention have a low HLB value, meaning that they are more lipophilic than hydrophilic, and they comprise both water-soluble blocks or segments (hydrophilic) and water-insoluble blocks or segments (lipophilic), and the HLB value is less than or equal to 6.

The molecular weights of the water-soluble component and the oleophilic components are not critical as long as the resulting amphiphilic block copolymer has an HLB equal to or less than 6. For example, the block copolymers can have a hydrophilic segment having a molecular weight ($M_h$) of at least 100 and up to and including 25,000, and a hydrophobic (or oleophilic) segment having a molecule weight ($M_n$) of at least 500 to and including 100,000.

In some embodiments, the amphiphilic block copolymer comprises a hydrophilic segment comprising polyethyleneoxide and a hydrophobic (oleophilic) segment comprising polycaprolactone. Further details of such block copolymers are provided in Kowalski et al., *Macromol. Rapid Commun.*, 1998, Vol. 19, 567, and in U.S. Pat. No. 5,429,826 (Nair et al.) that is incorporated herein by reference.

Other useful hydrophilic components for amphiphilic block copolymers can be derived from poly(2-ethyloxazolines), poly(saccharides), and dextrans.

The oleophilic block component of the amphiphilic block copolymers useful in the present invention can also be selected from many common components, including but not limited to, oleophilic components derived from monomers such as: styrene, caprolactone, propiolactone, β-butyrolactone, δ-valerolactone, ε-caprolactam, lactic acid, glycolic acid, hydroxybutyric acid, and derivatives of lysine and glutamic acid.

Particularly useful oleophilic components of the amphiphilic block copolymers useful in this invention are derived from polymers such as certain polyesters, polycarbonates, and polyamides, or more particularly polyesters such as poly(caprolactone) and its derivatives, poly(lactic acid), poly(3-hydroxybutyrate-co-3-hydroxyvalerate), poly(3-hydroxybutyrate), and poly(glycolic acid).

A particularly useful amphiphilic block copolymer can be defined as an A-B block copolymer that comprises a hydrophilic block (A) comprising polyethyleneoxide and a hydrophobic (oleophilic) block (B) comprising polycaprolactone represented herein as PEO-b-PCL.

The amphiphilic block copolymers can also be represented as "A-B-A" type wherein A and B are defined above. Although this invention is directed mainly towards amphiphilic block copolymers, graft copolymers and random graft copolymers containing similar components are also useful.

The amphiphilic block copolymer is generally present in the porous particles in an amount of at least 1 weight % and up to and including 99.5 weight %, or at least 2 weight % and up to and including 50 weight %, based on total porous particle dry weight. It is contemplated that in some embodiments, the amphiphilic block copolymer can comprise the water-insoluble polymer that forms the continuous polymeric solid phase of the porous particles and at the same time, function as the low HLB material that is disposed at the interface of the one or more discrete cavities.

The porous particles of this invention generally have a mode particle size of at least 1 μm and up to and including 100 μm, or typically of at least 4 μm and up to an including 50 μm. This mode particle size can be measured by automated image analysis and flow cytometry using any suitable equipment designed for that purpose. The mode particle size represents the most frequently occurring diameter for spherical porous particles and the largest diameter for the non-spherical porous particles.

In general, the total volume of the one or more discrete cavities in the porous particles is at least 5% and up to and including 80%, or more likely at least 15% and up to and including 60% based on the total dry porous particle volume. This porosity can be measured by the mercury intrusion technique.

The porous particles of this invention can be spherical or non-spherical depending upon the desired use. The shape of porous particles can be characterized by an "aspect ratio" that is defined as the ratio of the largest perpendicular length to the longest length of the porous particle. These lengths can be determined for example by optical measurements using a commercial particle shape analyzer such as the Sysmex FPIA-3000 (Malvern Instruments). For example, porous particles that are considered "spherical" for this invention can have an aspect ratio of at least 0.95 and up to and including 1. For the non-spherical porous particles of this invention, the aspect ratio can be at least 0.4 and up to and including 0.95.

Each porous particle of this invention can also comprise one or more surface stabilizing materials on its external particle surface. Useful surface stabilizing materials include but are not limited to, stabilizer polymers such as poly(vinyl pyrrolidone) and poly(vinyl alcohol), inorganic stabilizers such as clay particles, colloidal silica or fumed silica (for example LUDOX™ or NALCO™), or polymer latex particles as described in modified ELC process described in U.S. Pat. No. 4,833,060 (Nair et al.), U.S. Pat. No. 4,965,131 (Nair et al.), U.S. Pat. No. 2,934,530 (Ballast et al.), U.S. Pat. No. 3,615,972 (Morehouse et al.), U.S. Pat. No. 2,932,629 (Wiley), and U.S. Pat. No. 4,314,932 (Wakimoto et al.), the disclosures of which are hereby incorporated by reference. Any combination of these surface stabilizing materials can also be used.

The actual amount of surface stabilizing material present on the external surface of the porous particles depends on the size of the porous particles desired, which in turn depends upon the volume and weight ratios of the various phases used for making the emulsions (described below). While not intending to be limiting for this invention, the amount of surface stabilizing material in the water-in-oil-in-water emulsion can be at least 0.1 weight % and up to and including 10 weight %, or typically at least 0.2 and up to and including 7 weight %, based on the total weight of the water-in-oil phase in the water-in-oil-in-water emulsion, and depending upon the particle size of the surface stabilizing material (for example, colloidal or fumed silica particles or alumina particles). These amounts can translate into at least 0.2 weight % and up to and including 50 weight % of the dry porous particles.

Methods of Preparation

A method for making the porous particles of this invention involves basically a multi-step process. A first aqueous phase (primarily water as a solvent) is formed having dissolved therein, one or more cavity stabilizing hydrocolloids (described above). The one or more cavity stabilizing hydrocolloids can be present in this first aqueous phase in an amount of at least 0.5 weight % and up to and including 20 weight %, or typically of at least 1 weight % and up to and including 10 weight %, all based on the total first aqueous phase weight.

The first aqueous phase can also comprise a buffering salt, catalyst, colorant, release agent, bioactive agent, or any combination of these materials.

For example, particularly useful cavity stabilizing hydrocolloids include but are not limited to, carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropanesulfonate), a polyphosphate, and mixtures thereof.

An oil phase is also provided, which comprises one or more polymers or polymer precursors (as described below) and one or more amphiphilic block copolymers (described above) in a suitable organic solvent (or mixtures of organic solvents described below). The amphiphilic block copolymers, for example an A-B block copolymer described above, having a hydrophilic block segment comprising polyethyleneoxide (PEO) and an oleophilic block segment comprising polycaprolactone (PCL), or a PEO-b-PCL block copolymer, can be present in the oil phase in an amount of at least 0.2 weight % and up to and including 30 weight %, or typically of at least 0.5 weight % and up to and including 15 weight %, based on the total oil phase weight.

Any suitable organic solvent that will dissolve the water-insoluble polymers and that is also immiscible with water can be used to prepare the oil phase used in forming the first emulsion. Such organic solvents include but are not limited to, ethyl acetate, propyl acetate, chloromethane, dichloromethane, vinyl chloride, trichloromethane, carbon tetrachloride, ethylene chloride, trichloroethane, toluene, xylene, cyclohexanone, 2-nitropropane, dimethyl carbonate, and mixtures of two or more of these solvents. Ethyl acetate and propyl acetate are generally good solvents for many useful water-insoluble polymers while being sparingly soluble in water, and they are readily removed as described below by evaporation.

The first aqueous phase is then dispersed in the oil phase comprising one or more polymers (or polymer precursors) that eventually form a continuous polymeric solid phase, to form a first emulsion (first water-in-oil emulsion). These polymer(s) are dissolved in the organic solvent(s). The first aqueous phase creates the discrete cavities in the resulting porous particles. Ways to form the first emulsion are described below.

Salts can be added to the first aqueous phase to buffer the emulsion and optionally to control the osmotic pressure of the aqueous phase. When CMC is used as a cavity stabilizing hydrocolloid, for example, the osmotic pressure can be increased by using inorganic salts or a pH 7 buffer. The first emulsion can also contain additional cavity forming agents such as ammonium bicarbonate.

In some embodiments, the polymer used in the oil phase is a water-insoluble polymer that has a low acid number. Polymers that can be used include but are not limited to, polyesters, styrenic polymers (such as styrene/acrylate copolymers, styrene/alkyl methacrylate copolymers), mono-olefin polymers, vinyl ester polymers, α-methylene aliphatic monocarboxylic acid ester polymers, vinyl ether polymers, and vinyl ketone polymers. Particularly useful polymers are styrene-butyl acrylate copolymers, polycaprolactone, polyurethanes, and bisphenol-A polyester.

In other embodiments, the polymer is formed from one or more ethylenically unsaturated polymerizable monomers such as an ethylenically unsaturated polymerizable monomer selected from vinyl monomers and acrylic monomers. These monomers are included within the oil phase and can be polymerized using useful polymerization initiators.

Thus, in the method of this invention, the organic solution described above can be replaced with one or more ethylenically unsaturated polymerizable monomers (generally in liquid form) as polymer precursors and a polymerization initiator to form a second emulsion (water-in-oil-in-water emulsion). Thus, the organic solution comprises predominantly the ethylenically unsaturated polymerizable monomers as the organic solvents. The ethylenically unsaturated polymerizable monomers in the second emulsion can be polymerized for example through the application of heat or radiation (such as actinic or IR radiation) after the second emulsion is formed and before any organic solvents are removed to form one or more suitable water-insoluble polymers. Any organic solvents can be present in such small amounts and have sufficient solubility in water that it can be removed by washing with water. This washing can occur simultaneously with a filtration process. The resulting suspension of polymerized precursor porous particles can be isolated and re-slurried in water as described earlier to yield porous particles.

In addition, if desired, the water-immiscible ethylenically unsaturated polymerizable monomer(s) can be used in mixture with one or more water-insoluble polymers as described above. Useful ethylenically unsaturated polymerizable monomers and polymerization initiators would be readily apparent to one skilled in the art in order to achieve the desired continuous polymeric phase.

Optionally, the oil phase comprises a mixture of two or more water-immiscible solvents chosen from the list given above. For example, the oil phase can comprise a mixture of one or more of the above organic solvents with a water-immiscible non-solvent for the water-insoluble polymer such as heptane, cyclohexane, and diethylether that is added in a proportion that is insufficient to precipitate the water-insoluble binder polymer prior to drying and isolation.

Depending upon the ultimate use of the porous particles, the first emulsion can also include various additives that are added to the oil or the first aqueous phase. Such additives can include but are not limited to, colorants, charge control agents, shape control agents, compatibilizers, wetting agents, surfactants, lubricants, plasticizers, and release agents such as waxes and lubricants. Combinations of these materials can also be used. The first or second aqueous phase can also include a buffering salt examples of which are readily known in the art.

The next step in the formation of porous particles according to this invention involves forming a water-in-oil-in-water emulsion by dispersing the first emulsion (first water-in-oil emulsion) in a second aqueous phase containing a surface stabilizing material to form a second emulsion (water-in-oil-in-water emulsion) that contains droplets of the first water-in-oil emulsion. The surface stabilizing materials can be either stabilizer polymers such as poly(vinyl pyrrolidone) or poly(vinyl alcohol) or more likely a colloidal silica such as that available as LUDOX® or NALCO® silica or latex particles in a modified ELC process such as described in U.S. Pat. No. 4,965,131 (Nair et al.), U.S. Pat. No. 2,934,530 (Ballast et al.), U.S. Pat. No. 3,615,972 (Cohrs et al.), U.S. Pat. No. 2,932,629 (Wiley), and U.S. Pat. No. 4,314,932 (Wakimoto et al.), all of which are incorporated herein by reference.

The second aqueous phase comprises primarily water as the solvent, and it can also comprise buffering salts, shape control agents, surface stabilizing materials, and co-stabilizers or promoters to drive the surface stabilizing materials, particularly colloidal material, to the interface of the water-in-oil droplets in the second aqueous phase.

Suitable co-stabilizers or promoters include sulfonated polystyrenes, alginates, derivatives of cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water-soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and the like. A particularly useful promoter is poly(adipic acid-co-methylaminoethanol). The amount of any of the co-stabilizers or promoters used in the present invention can be at least 0.1 weight % to and including 20 weight % based on the total dry weight of the surface stabilizing materials.

The first water-in-oil emulsion used to prepare the porous particles can be prepared by any known emulsifying technique and conditions using any type of mixing and shearing equipment. Such equipment includes but is not limited to, a batch mixer, planetary mixer, single or multiple screw extruder, dynamic or static mixer, colloid mill, high pressure homogenizer, sonicator, or a combination thereof. While any high shear type agitation device is useful, a particularly useful homogenizing device is the Microfluidizer® such as Model No. 110T produced by Microfluidics Manufacturing operating at >5000 psi. In this device, the droplets of the first aqueous phase can be dispersed and reduced in size in the oil phase in a high flow agitation zone and, upon exiting this zone, the size of the aqueous phase droplets of the dispersed aqueous phase is reduced to uniform sized dispersed droplets in the oil phase. The temperature of the process can be modified to achieve the optimum viscosity for emulsification of the droplets and to minimize evaporation of the organic solvent (s).

Specifically, the water-in-oil emulsion is mixed with the second aqueous phase containing a surface stabilizing material such as colloidal silica and an optional co-stabilizer, to form an aqueous suspension of droplets of the water-in-oil emulsion in the second aqueous phase, which is then subjected to shear or extensional mixing or shear flow processes, such as through an orifice device to reduce the droplet size of the suspension, yet greater than the particle size of the first water-in-oil emulsion, to achieve narrow size distribution droplets through the limited coalescence process. The pH of the second aqueous phase is generally between 4 and 7 when silica particles are used as the surface stabilizing material. Useful surface stabilizing materials and co-stabilizers or promoters are described above. Colloidal or fused silica (for example LUDOX™ or NALCO™) is particularly useful. The actual amount of surface stabilizing material used depends upon the final desired size of the porous particles, which in turn depends upon the volume and weight ratios of the various phases used for making the multiple emulsions. While not intending to be limiting for this invention, the amount of surface stabilizing material in the second emulsion can be at least 0.1 weight % and up to and including 10 weight %, or typically at least 0.2 weight % and up to and including 7 weight %, based on the total weight of the water-in-oil phase in the water-in-oil-in-water emulsion and depending upon the particle size of the surface stabilizing material.

When the second (water-in-oil-in-water) emulsion is homogenized, shear or extensional mixing or flow process is controlled in order to minimize disruption of the distinct droplets of the first aqueous phase in the oil phase. Droplet size reduction is achieved by homogenizing the water-in-oil emulsion in the second aqueous phase through a capillary orifice device, or other suitable flow geometry. The shear field used to create the droplets can be created using standard shear geometries, such as an orifice plate or capillary orifice device. However, the flow field can also be generated using alternative geometries, such as packed beds of beads, or stacks or screens that impart an additional extensional component to the flow. It is well known in the literature that membrane-based emulsifiers can be used to generate multiple emulsions.

The techniques allow the droplet size to be tailored across a wider range of sizes by adjusting the cavity volume or mesh size, and can be applied across a wide range of flow rates. The back pressure suitable for producing acceptable particle size and size distribution is at least 100 psi and up to and including 5000 psi, or typically at least 500 psi and up to and including 3000 psi. The flow rate is generally at least 1000 ml/min and up to and including 6000 ml/min, particularly when a capillary orifice device is used.

Water can be added to the water-in-oil-in-water emulsion before removing the organic solvent or polymerizing the polymer precursor if present.

Optionally, after the second emulsion has been formed, additional water can be added to the second emulsion (water-in-oil-in-water emulsion) to increase the size of the one or more discrete cavities by creating an osmotic pressure mismatch between the first and second aqueous phases allowing for the migration of water from the second aqueous phase to the first.

The final size of the porous particles and the final size of the one or more discrete cavities of the porous particles can be impacted by the osmotic mismatch between the osmotic pressure of the first and second aqueous phases. At each interface, the larger the osmotic pressure gradient present, the faster the diffusion rate where water will diffuse from the lower osmotic pressure phase to the higher osmotic pressure phase depending on the solubility and diffusion coefficient in the organic solution.

The shape of the semi-permeable particles can be modified if necessary by reducing the spherical nature (sphericity) of the particles (for example, an aspect ratio of less than 0.95, or an aspect ratio of at least 0.4 and up to and including 0.95). In the method used to prepare the porous particles, additives (shape control agents) can be incorporated into the first aqueous phase or in the organic solution to modify the shape, aspect ratio, or morphology of the resulting porous particles. The shape control agents can be added after or prior to forming the second emulsion. Some useful shape control agents are quaternary ammonium tetraphenylborate salts described in U.S. Patent Application Publication 2007/0298346 (Ezenyilimba et al.), metal salts described in U.S. Patent Application Publication 2008/0145780 (Yang et al.), carnauba waxes described in U.S. Pat. No. 5,283,151 (Santilli), SOLSPERSE® hyperdispersants as described in U.S. Pat. No. 5,968,702 (Ezenyilimba et al.), metal salts as described in U.S. Pat. No. 7,655,375 (Yang et al.), and zinc organic complexes as described in U.S. Pat. No. 7,662,535 (Yang et al.). All of these publications are incorporated herein by reference. The more desirable shape control agents are polyethyloxazoline, fatty acid modified polyesters such as EFKA® 6225 and EFKA® 6220 from Ciba BASF, and phosphate esters of alkoxylated phenols such as SynFac® 8337.

The organic solvents can be removed from the water-in-oil-in-water emulsion after the first emulsion droplets are formed in the second aqueous phase. Removal of the organic solvents provides solidified precursor porous particles that can be subjected to isolation from the second aqueous phase, washing, and optional drying techniques to provide the desired porous particles. The details of these procedures depend upon the water solubility and boiling points of the organic solvents in the oil phase relative to the temperature of the organic solvent removal process. Generally, organic solvents can be removed by evaporation using removal apparatus such as a rotary evaporator or a flash evaporator.

The solidified precursor porous particles can then be isolated after removing the organic solvents by filtration or centrifugation, washing to remove any contamination from the second aqueous phase, optionally followed by drying, for example, in an oven at 40° C. that also removes any water remaining in the discrete cavities. Advantageously, the porous particles can be used directly without removing the water from the one or more discrete cavities, that is, as aqueous slurries. Optionally, the porous particles can be treated with alkali to remove any surface stabilizing material if desired. In other embodiments, any amount of the water can be removed from the one or more discrete cavities, and up to and at least 98 weight % of the water can be removed if desired.

The porous particles can be prepared and provided in dry powder form or as aqueous slurries. They can be used in either form.

The present invention provides at least the following embodiments and combinations thereof, but other combinations of features are considered to be within the present invention as a skilled artisan would appreciate from the teaching of this disclosure:

1. A porous particle comprising a water-insoluble polymer that provides a continuous polymeric solid phase including an external particle surface, and one or more discrete cavities having inner walls and that are dispersed within the continuous polymeric solid phase, wherein the porous particle further comprises a cavity stabilizing hydrocolloid on the inner walls of the one or more discrete cavities, and an amphiphilic (low HLB) block copolymer that is disposed at the interface of the one or more discrete cavities and the continuous polymeric solid phase.

2. The porous particle of embodiment 1, wherein the cavity stabilizing hydrocolloid is carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropane sulfonate, a polyphosphonate, or mixtures thereof.

3. The porous particle of embodiment 1 or 2, wherein the cavity stabilizing hydrocolloid is present in an amount of at least 0.5 weight % and up to and including 20 weight %, based on total porous particle dry weight.

4. The porous particle of any of embodiments 1 to 3, wherein the amphiphilic block copolymer comprises a hydrophilic segment comprising polyethyleneoxide and an oleophilic segment comprising polycaprolactone.

5. The porous particle of any of embodiments 1 to 4, wherein the amphiphilic block copolymer is present in an amount of at least 1 weight % and up to and including 99.5 weight %, based on total porous particle dry weight.

6. The porous particle of any of embodiments 1 to 5 having a mode particle size of at least 1 μm and up to and including 100 μm.

7. The porous particle of any of embodiments 1 to 6, wherein the water-insoluble polymer is a polyester, styrenic polymer, acrylic polymer, mono-olefin polymer, vinyl ester polymer, α-methylene aliphatic monocarboxylic acid ester polymer, vinyl ether polymer, vinyl ketone polymer, or aliphatic cellulose ester polymer.

8. The porous particle of any of embodiments 1 to 7 having an aspect ratio of at least 0.4.

9. The porous particle of any of embodiments 1 to 8, further comprising a surface stabilizing material on the external particle surface that is poly(vinyl pyrrolidone), clay particles, poly(vinyl alcohol), colloidal silica, fumed silica, polymeric latex particles, or a combination of these materials.

10. The porous particle of any of embodiments 1 to 9, wherein the total volume of the one or more discrete cavities is a least 5% and up to and including 80%, based on total porous particle dry volume.

11. A method for preparing the porous particle of any of embodiments 1 to 10, comprising:

providing: (a) a first aqueous phase comprising a cavity stabilizing hydrocolloid, and (b) an oil phase comprising a water-insoluble polymer or polymer precursor, an amphiphilic (low HLB) block copolymer and optionally an organic solvent, dispersing the first aqueous phase in the oil phase to form a water-in-oil emulsion, dispersing the water-in-oil emulsion in a second aqueous phase containing a surface stabilizing material to form a water-in-oil-in-water emulsion containing droplets of the water-in-oil emulsion, removing the organic solvent of the oil phase from the water-in-oil-in-water emulsion, or polymerizing a polymer precursor if present, to form a solidified precursor porous particle comprising a water-insoluble polymer that provides a continuous polymeric solid phase including an external particle surface, and one or more discrete cavities having inner walls and that are dispersed within the continuous polymeric solid phase, wherein the solidified precursor porous particle further comprises the cavity stabilizing hydrocolloid on the inner walls of the one or more discrete cavities, and the amphiphilic (low HLB) block copolymer that is disposed at the interface of the one or more discrete cavities and the continuous polymeric solid phase, and isolating (and optionally drying) the solidified precursor porous particle to provide a porous particle.

12. The method of embodiment 11, wherein the amphiphilic block copolymer emulsifier comprises a hydrophilic segment comprising polyethyleneoxide and an oleophilic segment comprising polycaprolactone.

13. The method of any of embodiments 11 or 12, wherein the polymer precursor is an ethylenically unsaturated polymerizable monomer.

14. The method of any of embodiments 11 to 13 wherein the polymer precursor is an ethylenically unsaturated polymerizable monomer selected from vinyl monomers and acrylic monomers.

15. The method of any of embodiments 11 to 14, wherein the water-insoluble polymer is a polyester, styrenic polymer, acrylic polymer, mono-olefin polymer, vinyl ester polymer, α-methylene aliphatic monocarboxylic acid ester polymer, vinyl ether polymer, vinyl ketone polymer, or aliphatic cellulose ester polymer.

16. The method of any of embodiments 11 to 15, wherein the surface stabilizing material comprises poly(vinyl pyrrolidone), poly(vinyl alcohol), colloidal silica, fumed silica, polymer latex particles, or any combination thereof.

17. The method of any of embodiments 11 to 16, wherein the surface stabilizing material is present in the water-in-oil-in-water emulsion in an amount of at least 0.1 weight % and up to an including 10 weight % of the water-in-oil phase.

18. The method of any of embodiments 11 to 17 further comprising drying the solidified precursor porous particle.

19. The method of any of embodiments 11 to 18, wherein the oil phase comprises an organic solvent that is selected from the group consisting of ethyl acetate, propyl acetate, chloromethane, dichloromethane, vinyl chloride, trichloromethane, carbon tetrachloride, ethylene chloride, trichloroethane, toluene, xylene, cyclohexanone, dimethyl carbonate, and 2-nitropropane, and a mixture of two or more of these solvents.

20. The method of any of embodiments 11 to 19, wherein between, water is added to the water-in-oil-in-water emulsion before removing the organic solvent or polymerizing the polymer precursor if present.

21. The method of any of embodiments 11 to 20, wherein the water-in-oil-in-water emulsion is homogenized using a capillary orifice device.

22. The method of any of embodiments 11 to 21, wherein the water-in-oil-in-water emulsion is homogenized using a back pressure of at least 100 and up to and including 5000 psi using a flow rate is at least 1000 ml/min and up to and including 6000 ml/min 23. The method of any of embodiments 11 to 22, wherein the pore stabilizing hydrocolloid is selected from the group consisting of carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropanesulfonate), a polyphosphate, and mixtures thereof.

The following Examples are provided to illustrate the practice of this invention and are not meant to be limiting in any manner.

The following materials used in the Examples:

Amphiphilic block copolymers of the PEO-b-PCL were prepared using the procedure described in U.S. Pat. No. 5,429,826 (noted above). The amphiphilic block copolymers were designed to have the following molecular weights in the block components where the first number is the molecular weight of the hydrophilic block segment and the second number is the molecular weight of the oleophilic block segment: 5,000-20,000, 5,000-25,000, 5,000-50,000, and 750-45,000.

Ethylenically unsaturated polymer precursor can be obtained from Sigma Aldrich Company. Ethyl methacrylate can be obtained from Acros Organics.

CN301, polybutadiene dimethacrylate 1, 6 hexanediol diacrylate ester polymer precursor can be obtained from Sartomer USA, LLC.

The polyester resin, Kao C can be obtained from Kao Specialties Americas LLC.

Polycaprolactone (MW 45,000) can be obtained from Sigma Aldrich Company.

Polyurethane (PU-5, acid number 5, molecular weight of 67,000) was derived from polycaprolactone diol and isophorone diisocyanate using known reaction procedures.

Carboxy methylcellulose ($M_n$=250,000) can be obtained from Acros Organics or from Ashland Aqualon as Aqualon 9M31F. These products were used interchangeably.

Nalco™ 1060, a colloidal silica, can be obtained from. Nalco Chemical Company as a 50 weight % aqueous dispersion.

The initiator, 2,2'-azobis-(2,4-dimethylvaleronitrile) (Vazo 52) can be obtained from the Dupont Company.

GRINDSTED® PGPR 90 (a random copolymer) can be obtained from Danisco.

EFKA 6225, a fatty acid modified polyester used as a shape control agent, can be obtained from Ciba Specialty Chemicals.

Span™ 80 nonionic surfactant (sorbitan oleate) and small molecule emulsifier can be obtained from Uniqema (ICI America, Inc.).

Tween™ 80 non-ionic surfactant (Polysorbate 80), derived from polyethoxylated sorbitan and oleic acid) and small molecule emulsifier can be obtained from Uniqema (ICI Americas, Inc.).

Alcolec Lecithin (HLB=7), also a small molecule surfactant, was obtained from American Lecithin Company.

The shape control agent, poly(2-ethyl-2-oxazoline) ($M_n$=50,000, PEOX) can be obtained from Sigma Aldrich Company.

The poly(methylamino ethanol adipate) (AMAE) co-stabilizer was prepared using known procedures and starting materials.

The size and shape of the porous particles according to the present invention were measured using a Sysmex FPIA-3000 automated particle shape and size analyzer from Malvern Instruments. In this method, samples were passed through a sheath flow cell that transformed the particle suspension into narrow or flat flow, ensuring that the largest area of the particle was oriented towards the camera and that all particles were in focus. The CCD camera captured 60 images every second and these were analyzed in real time. Numerical evaluation of particle shape was derived from measurement of the area of the particle. A number of shape factors were calculated including circularity, aspect ratio, and circle equivalent diameter. Aspect ratio is defined as described above. The reported size of the particles is the average mode value of the distribution.

Porosity of the porous particles was measured using mercury intrusion porosimetry.

To further characterize the distribution of cavity (pore) sizes within a given porous particle, representative scanning electron micrographs were taken of fractured porous particles and simple image analysis routines were used to first identify the one or more discrete cavities within the porous particles and then to measure the diameter of the cavities. A commercial statistical analysis software package was then used to study the distribution of the cavities within the porous particles. The porous particles prepared according to this invention were evaluated using optical microscopy at both 600× and 1000× magnification for visualizing the marker materials in the one or more discrete cavities.

The porous particles were prepared using the following procedures:

Control 1

Water-in-Oil Emulsion of Methyl Methacrylate Stabilized with SPan™ 80/Tween™ 80

An oil phase (100 g) containing 2 weight % of Span™ 80/Tween™ 80 in a 65/35 weight ratio and 98 weight % of methyl methacrylate was emulsified in an aqueous phase prepared with 31.4 g of 2.0 weight % solution of carboxy methyl cellulose in water using the Silverson Mixer followed by homogenization in the Microfluidizer® at 9800 psi (698 kg$_f$/cm$^2$) to give a water-in-oil emulsion. This emulsion had very large droplet size (>5 μm), was not stable over time, and could not be converted to a porous particle using the water-in-oil-in-water emulsion method of the present invention.

Control 2

Water-in-Oil Emulsion of Kao C in Ethyl Acetate Stabilized with PGPR

An organic phase (100 g) containing 19.6 weight % of Kao C polymer and 0.4 weight % of PGPR in ethyl acetate was mixed with an aqueous phase prepared with 30.7 g of a 2 weight % solution of carboxy methyl cellulose as described for Control 1. The resulting water-in-oil emulsion was unstable, ripened rapidly upon standing, and could not be converted to a porous particle using the water-in-oil-in-water method of the present invention.

Control 3

Particle Derived from Water-in-Oil Emulsion of Polymer Precursors Stabilized with Lecithin An oil phase was prepared using 25 g of CN301, 75 g of methyl methacrylate, 2 g of Alcolec Lecithin HLB=7, and 1.2 g of a 40 weight % of EFKA 6225 solution in ethyl acetate. This oil phase was emulsified with an aqueous phase containing 43 g of a 2 weight % solution of carboxymethyl cellulose as described for Control 1 to yield a uniform, fine water-in-oil emulsion having a droplet size less than 0.5 μm. A 90 g aliquot of this emulsion was emulsified with a second water phase consisting of 125 g of a 200 mmolar citrate phosphate buffer at pH 4, 8 g of Nalco™ 1060, and 1 g of a 10 weight % AMAE co-stabilizer solution in water using the Silverson Mixer fitted with a General-Purpose Disintegrating Head for two minutes at 2000 RPM, followed by homogenization in an orifice disperser at 1000 psi to form a water-in-oil-in-water emulsion. This water-in-oil-in-water emulsion was then diluted with an equal weight of water containing a 0.03 weight % solution of PEOX and 3 ml of a 2.5 weight % solution of potassium dichromate in water and polymerized under nitrogen at 55° C. with stirring for 14 hours followed by further polymerization at 70° C. for 4 hours. The resulting polymeric particles did not exhibit any porosity. The water-in-oil emulsion was not stable enough to survive polymerization and to provide porous particles.

Control 4

Water-in-Oil Emulsion of Methyl Methacrylate Stabilized with PEO-b-PCL (5,000-20,000) Amphiphilic Block Copolymer without Cavity Stabilizing Hydrocolloid in First Aqueous Phase An oil phase (102 g) containing 2 weight % of PEO-b-PCL amphiphilic block copolymer (5,000-20,000 segment molecular weights) and 98 weight % of methyl methacrylate was emulsified with an aqueous phase consisting of 31.4 g of water as described for Control 1. The resulting water-in-oil emulsion was unstable and ripened rapidly upon standing, showing the need for the presence of a cavity stabilizing hydrocolloid in the first aqueous phase.

Control 5

Water-in-Oil Emulsion of Polycaprolactone in Ethyl Acetate Stabilized with PGPR

An oil phase (172 g) was prepared using 121 g of a 27.9 weight % solution of polycaprolactone in ethyl acetate, 1.38 g of PGPR, and 49.7 g of ethyl acetate. This oil phase was mixed with an aqueous phase prepared with 34.6 g/of a 3 weight % solution of carboxy methyl cellulose as described in Control 1 to give a water-in-oil emulsion that had a droplet size of 6 μm. The resulting water-in-oil emulsion had a broad particle size distribution and was not stable over time.

Invention Example 1

Water-in-Oil Emulsion of Methyl Methacrylate Stabilized with PEO-b-PCL (5,000-20,000) Amphiphilic Block Copolymer and Cavity Stabilizing Hydrocolloid An oil phase (102 g) containing 2 weight % of PEO-b-PCL amphiphilic block copolymer (5,000-20,000 segment molecular weights) and 98 weight % of methyl methacrylate was emulsified with an aqueous phase prepared with 31.4 g of a 2.0 weight % solution of carboxy methyl cellulose in water using the Silverson Mixer followed by homogenization in the Microfluidizer® at 9800 psi to give a water-in-oil emulsion that had a droplet size of 0.38 µm. The resulting water-in-oil emulsion was uniform and did not destabilize with time, compared to the emulsion formed in Control 4 that was prepared in the same manner but without the cavity stabilizing hydrocolloid in the first aqueous phase. This example shows that the cavity stabilizing hydrocolloid is needed in the first aqueous phase to provide a stable first water-in-oil emulsion.

Invention Example 2

Water-in-Oil Emulsion of Methyl Methacrylate Stabilized with PEO-b-PCL (5,000-50,000) Amphiphilic Block Copolymer and Cavity Stabilizing Hydrocolloid An oil phase (102 g) containing 2 weight % of PEO-b-PCL amphiphilic block copolymer (5,000:50,000 segment molecular weights) and 98 weight % of methyl methacrylate was emulsified with an aqueous phase prepared with 31.4 g of a 2.0 weight % solution of carboxy methyl cellulose in water as described in Invention Example 1 to give a water-in-oil emulsion that had a droplet size of 0.59 µm. The resulting water-in-oil emulsion was uniform and did not destabilize with time, compared to the emulsion prepared in Control 4 that was made in the same manner but without a cavity stabilizing hydrocolloid in the first aqueous phase.

Invention Example 3

Water-in-oil Emulsion of Ethyl Methacrylate Stabilized with PEO-b-PCL (5,000-25,000) Amphiphilic Block Copolymer An oil phase (102 g) containing 98 weight % ethyl methacrylate and a 2 weight % PEO-b-PCL amphiphilic block copolymer (5,000-25,000 segment molecular weights) in ethyl acetate was mixed with an aqueous phase prepared with 31 g of a 2 weight % solution of carboxy methylcellulose as described in Invention Example 1 to give a water-in-oil emulsion that had a droplet size of 0.49 µm. The resulting water-in-oil emulsion was uniform and did not destabilize with time.

Invention Example 4

Water-in-oil Emulsion of Polycaprolactone in Ethyl Acetate Stabilized with PEO-b-PCL (750-45,000) Amphiphilic Block Copolymer An oil phase (50 g) containing 15 weight % of polycaprolactone and 5 weight % PEO-b-PCL (750-45,000 segment molecular weights) in ethyl acetate was mixed with an aqueous phase prepared with 15 g of a 2 weight % solution of carboxy methylcellulose as described in Invention Example 1 to give a water-in-oil emulsion that had a droplet size of 0.82 µm. The resulting water-in-oil emulsion was uniform and did not destabilize with time.

Invention Example 5

Porous Particle Derived from Kao C Polymer Using PEO-b-PCL (5,000-20,000) Amphiphilic Block Copolymer An oil phase was prepared using 425 g of a 20 weight % solution of Kao C polymer in ethyl acetate and 15 g of a 28 weight % solution of PEO-b-PCL (5,000-20,000 segment molecular weights) in ethyl acetate. This oil phase was mixed with an aqueous phase prepared with 131 g of a 2 weight % solution of carboxy methylcellulose as described in Invention Example 1 to give a water-in-oil emulsion that had a droplet size of 0.19 µm. The resulting water-in-oil emulsion was uniform and did not destabilize with time. A 200 g aliquot of the water-in-oil emulsion was combined with a second water phase consisting of 320.5 g of a pH 4 citrate phosphate buffer and 12.8 g of Nalco™ 1060 using the Silverson L4R mixer followed by homogenization in an orifice homogenizer. The ethyl acetate of the resulting water-in-oil-water was evaporated using a Heidolph Laborata rotary evaporator at 40° C. under reduced pressure. The resulting porous particles had an average mode value of 8.3 µm, an aspect ratio of 0.97, and a porosity of 35%. This demonstrates that the water-in-oil emulsion stabilized by the amphiphilic block copolymer PEO-b-PCL was stable enough to survive polymerization and provided porous particles of this invention. These results can be compared to Control 2 where a similar water-in-oil emulsion could not be stabilized using PGPR as an emulsifier.

Invention Example 6

Porous Particles Derived from Water-in-Oil Emulsion of Monomers Stabilized with PEO-b-PCL (5,000-20,000) Amphiphilic Block Copolymer The water-in-oil emulsion was prepared and converted to porous particles using CN301 and methyl methacrylate in ethyl acetate as described for Control 3 except that PEO-b-PCL (5,000-20,000 segment molecular weights) amphiphilic block copolymer was used as the stabilizer in place of Alcolec Lecithin (HLB=7). The resulting particles were porous and had an average mode size of 10.6 µm and an average pore size of 0.5 µm, compared to the particles described in Control 3 that were not porous.

Invention Example 7

Porous Particles Derived from Polycaprolactone Using PEO-b-PCL (5,000-25,000) Amphiphilic Block Copolymer An oil phase (172 g) was prepared using 35.4 g of a 20.28 weight % solution of polycaprolactone in ethyl acetate and 5.6 g of a 20.0 weight % solution of PEO-b-PCL (5,000-25,000 segment molecular weights) amphiphilic block copolymer in ethyl acetate, and 131 g of ethyl acetate. This oil phase was mixed with an aqueous phase prepared with 52.9 g of a 2 weight % solution of carboxy methyl cellulose as described for Invention Example 1 to give a water-in-oil emulsion that had a droplet size of 0.25 µm. The resulting water-in-oil emulsion was uniform and did not destabilize with time. A 200 g aliquot of the water-in-oil emulsion was combined with a second water phase consisting of 321.2 g of a pH 4 citrate phosphate buffer and 12.8 g of Nalco™ 1060, homogenized, and converted to porous particles as described in Invention Example 5. The resultant porous particles had a mode size of 9.0 µm, and the results are compared to Control 5 where the water-in-oil emulsion was unstable and the particles were large in size.

Invention Example 8

Water-in-oil Emulsion of Polyurethane PU-5 in Ethyl Acetate Stabilized with PEO-b-PCL (5,000-20,000) Amphiphilic Block Copolymer An oil phase was prepared using 168.8 g of a 26.6 weight % solution of polyurethane PU-5 in ethyl acetate and 3.6 g of a 20.0 weight % solution of PEO-b-PCL (5,000-20,000 segment molecular weights) amphiphilic block copolymer in ethyl acetate, and 56.6 of ethyl acetate. This oil phase was mixed with an aqueous phase prepared with 70.5 g of a 2 weight % solution of carboxy methyl cellulose as described in Invention Example 1 to give a water-in-oil emulsion that had a droplet size of 0.86 μm. The resulting water-in-oil emulsion was uniform and did not destabilize with time.

Invention Example 9

Porous Particles Derived from Polycaprolactone Amphiphilic Block Copolymer PEO-b-PCL (5,000-45,000)

An oil phase was prepared using 154 g of a 6.6 weight % solution of PEO-b-PCL (5,000-45,000 segment molecular weights) in ethyl acetate. The oil phase was mixed with an aqueous phase prepared with 50 g of a 2 weight % solution of carboxy methyl cellulose as described in Control 1 to give a water-in-oil emulsion. The resulting water-in-oil emulsion was uniform and was stable over time. A 204 g aliquot of the water-in-oil emulsion was combined with a second water phase having 328 g of a pH 4 citrate phosphate buffer and 13 g of Nalco™ 1060 silica, homogenized, and converted to porous particles as described above in Invention Example 5.

The invention has been described in detail with particular reference to certain preferred embodiments thereof, but it will be understood that variations and modifications can be effected within the spirit and scope of the invention.

The invention claimed is:

1. A porous particle comprising a water-insoluble polymer that provides a continuous polymeric solid phase including an external particle surface, and one or more discrete cavities having inner walls and that are dispersed within the continuous polymeric solid phase,
wherein the porous particle further comprises a cavity stabilizing hydrocolloid on the inner walls of the one or more discrete cavities, and an amphiphilic block copolymer that is disposed at the interface of the one or more discrete cavities and the continuous polymeric solid phase.

2. The porous particle of claim 1, wherein the cavity stabilizing hydrocolloid is carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropane sulfonate, a polyphosphonate, or mixtures thereof.

3. The porous particle of claim 1, wherein the cavity stabilizing hydrocolloid is present in an amount of at least 0.5 weight % and up to and including 20 weight %, based on total porous particle dry weight.

4. The porous particle of claim 1, wherein the amphiphilic block copolymer comprises a hydrophilic segment comprising polyethyleneoxide and an oleophilic segment comprising polycaprolactone.

5. The porous particle of claim 1, wherein the amphiphilic block copolymer is present in an amount of at least 1 weight % and up to and including 99.5 weight %, based on total porous particle dry weight.

6. The porous particle of claim 1 having a mode particle size of at least 1 μm and up to and including 100 μm.

7. The porous particle of claim 1, wherein the water-insoluble polymer is a polyester, styrenic polymer, acrylic polymer, mono-olefin polymer, vinyl ester polymer, α-methylene aliphatic monocarboxylic acid ester polymer, vinyl ether polymer, vinyl ketone polymer, or aliphatic cellulose ester polymer.

8. The porous particle of claim 1 having an aspect ratio of at least 0.4.

9. The porous particle of claim 1, further comprising a surface stabilizing material on the external particle surface that is poly(vinyl pyrrolidone), poly(vinyl alcohol), clay particles, colloidal silica, fumed silica, polymeric latex particles, or a combination of these materials.

10. The porous particle of claim 1, wherein the total volume of the one or more discrete cavities is a least 5% and up to and including 80%, based on total porous particle dry volume.

11. A method for preparing a porous particle, comprising:
providing: (a) a first aqueous phase comprising a cavity stabilizing hydrocolloid, and (b) an oil phase comprising a water-insoluble polymer or polymer precursor, an amphiphilic block copolymer and optionally an organic solvent,
dispersing the first aqueous phase in the oil phase to form a water-in-oil emulsion,
dispersing the water-in-oil emulsion in a second aqueous phase containing a surface stabilizing material to form a water-in-oil-in-water emulsion containing droplets of the water-in-oil emulsion,
removing the organic solvent of the oil phase from the water-in-oil-in-water emulsion, or polymerizing a polymer precursor if present, to form a solidified precursor porous particle comprising a water-insoluble polymer that provides a continuous polymeric solid phase including an external particle surface, and one or more discrete cavities having inner walls and that are dispersed within the continuous polymeric solid phase,
wherein the solidified precursor porous particle further comprises the cavity stabilizing hydrocolloid on the inner walls of the one or more discrete cavities, and the amphiphilic (low HLB) block copolymer that is disposed at the interface of the one or more discrete cavities and the continuous polymeric solid phase, and
isolating the solidified precursor porous particle to provide a porous particle.

12. The method of claim 1, wherein the amphiphilic block copolymer emulsifier comprises a hydrophilic segment comprising polyethyleneoxide and an oleophilic segment comprising polycaprolactone.

13. The method of claim 11, wherein the polymer precursor is an ethylenically unsaturated polymerizable monomer.

14. The method of claim 11 wherein the polymer precursor is an ethylenically unsaturated polymerizable monomer selected from vinyl monomers and acrylic monomers.

15. The method of claim 11, wherein the water-insoluble polymer is a polyester, styrenic polymer, acrylic polymer, mono-olefin polymer, vinyl ester polymer, α-methylene aliphatic monocarboxylic acid ester polymer, vinyl ether polymer, vinyl ketone polymer, or aliphatic cellulose ester polymer.

16. The method of claim 11, wherein the surface stabilizing material comprises poly(vinyl pyrrolidone), poly(vinyl alcohol), clay particles, colloidal silica, fumed silica, polymer latex particles, or any combination thereof.

17. The method of claim 11, wherein the surface stabilizing material is present in the water-in-oil-in-water emulsion in an amount of at least 0.1 weight % and up to an including 10 weight % based on the total weight of the water-in-oil phase.

18. The method of claim 11 further comprising drying the solidified precursor porous particle.

19. The method of claim 11, wherein the oil phase comprises an organic solvent that is selected from the group consisting of ethyl acetate, propyl acetate, chloromethane, dichloromethane, vinyl chloride, trichloromethane, carbon tetrachloride, ethylene chloride, trichloroethane, toluene, xylene, cyclohexanone, dimethyl carbonate, and 2-nitropropane, and a mixture of two or more of these solvents.

20. The method of claim 11, wherein the water-in-oil-in-water emulsion is homogenized using a capillary orifice device.

21. The method of claim 20, wherein the water-in-oil-in-water emulsion is homogenized using a back pressure of at least 100 and up to and including 5000 psi using a flow rate is at least 1000 ml/min and up to and including 6000 ml/min.

22. The method of claim 11, wherein the pore stabilizing hydrocolloid is selected from the group consisting of carboxymethyl cellulose (CMC), a gelatin or gelatin derivative, a protein or protein derivative, a hydrophilic synthetic polymer, a water-soluble microgel, a polystyrene sulfonate, poly (2-acrylamido-2-methylpropanesulfonate), a polyphosphate, and mixtures thereof.

23. The method of claim 11, wherein between, water is added to the water-in-oil-in-water emulsion before removing the organic solvent or polymerizing the polymer precursor if present.

* * * * *